United States Patent [19]

Inoue et al.

[11] 4,058,647

[45] Nov. 15, 1977

[54] PROCESS FOR PREPARING LAMINATED RESIN PRODUCT

[75] Inventors: Takayuki Inoue; Tetsuji Kakizaki; Masahide Ochiumi, all of Yokkaichi, Japan

[73] Assignee: Mitsubishi Petrochemical Co., Ltd., Tokyo, Japan

[21] Appl. No.: 661,413

[22] Filed: Feb. 25, 1976

[30] Foreign Application Priority Data

Feb. 27, 1975 Japan .................................. 50-24255
July 25, 1975 Japan .................................. 50-90940

[51] Int. Cl.$^2$ ...................... B32B 27/34; B32B 25/00; C09J 7/00

[52] U.S. Cl. ..................... 428/474; 156/306; 156/309; 156/334; 156/338; 426/127; 428/480; 428/483; 428/492; 428/500; 428/520; 428/521; 428/522

[58] Field of Search .............. 428/492, 483, 480, 474, 428/521, 520, 500, 522; 426/127; 156/306, 309, 334, 338

[56] References Cited

U.S. PATENT DOCUMENTS

| 3,043,716 | 7/1962 | Busse | 428/483 |
| 3,595,740 | 7/1971 | Gerow | 428/474 |
| 3,847,728 | 11/1974 | Hirata | 428/518 |
| 3,868,433 | 2/1975 | Bartz | 428/480 |
| 3,892,058 | 7/1975 | Komatsu | 428/480 |
| 3,922,473 | 11/1975 | Kosaka | 428/483 |
| 3,931,449 | 1/1976 | Hirata | 428/474 |
| 3,932,692 | 1/1976 | Hirata | 428/474 |
| 3,949,114 | 4/1976 | Viola | 428/483 |

Primary Examiner—Ellis Robinson
Attorney, Agent, or Firm—Oblon, Fisher, Spivak, McClelland & Maier

[57] ABSTRACT

In a process for preparing a laminated resin product by melt-laminating (1) a modified polyolefin composition with (2) a polyester, a polyamide or a hydrolyzed copolymer of ethylenevinylacetate, the improvement comprising using as the modified polyolefin a modified polyolefin composition which comprises a mixture of 60 – 97 wt.% of a polyolefin which polyolefin comprises from 0.1 to 100 wt.% of a polyolefin modified with an unsaturated acid or anhydride content is from 0.01 to 10 wt.% of the total polyolefin content and wherein an unmodified polyolefin comprises from 99.9 to 0 wt.% of the total polyolefin content with 40 – 3 wt.% of a rubber component having 40 – 140 of Mooney viscosity 50 $ML_1 + _4$ (100° C) and the product so produced.

11 Claims, No Drawings

PROCESS FOR PREPARING LAMINATED RESIN PRODUCT

BACKGROUND OF THE INVENTION

The present invention relates to a process for preparing a laminated resin product having a high oil resistance, gas-barrier properties and high mechanical strength which comprises a substrate made of a polyester, a polyamide or a hydrolyzed copolymer of ethylene-vinylacetate.

Polyesters, polyamides, and hydrolyzed copolymers of ethylene-vinylacetate (hereinafter referred to as hydrolyzed EVA) have high gas barrier properties, oil resistance and high strength. However, they are relatively hard to use in the food and automobile fields alone because of their high cost and high steam permeability. On the other hand, polyolefins have been used in various fields because of low cost, high mechanical strength, transparency, moldability and sanitary properties. However, polyolefins have inferior gas-barrier properties and oil resistance and, accordingly, when polyolefins are used as food containers for mayonnaise or soybean sauce, a long storage life of the food is not attained. When polyolefins are used as gasoline containers, the gasoline is lost by permeation and the container is deformed by swelling, disadvantageously. In order to overcome the disadvantages of polyolefins, various improvements have been proposed, however, a satisfactory result has not been attained because of complicated processes, high cost and limitation of usage and design.

As one improvement, it has been proposed to form a laminated sheet with a polyester, a polyamide, a hydrolyzed EVA, etc. which has characteristics to overcome said disadvantages.

However, polyolefins are nonpolar materials as is evident from their chemical structure, and they have low affinity for said resins. Accordingly, even though a polyolefin is melt pressed with one of said resins, the layers of the laminated product can be easily removed by peeling.

It has been proposed to provide an adhesive composition layer between the layers of said resins. However, it is necessary to have an additional step of coating an adhesive composition in said case whereby the lamination process is disadvantageously complicated.

SUMMARY OF THE INVENTION

It is an object of the invention to provide a process for preparing a laminated resin product which has high gas-barrier property, water resistance and low cost wherein both layers of resins are firmly bonded without an adhesive composition.

The object of the invention has been attained by providing a process for preparing a laminated resin product which comprises melt-laminating (1) a modified polyolefin composition with (2) a polyester, a polyamide or a hydrolyzed copolymer of ethylene-vinylacetate wherein said polyolefin composition is a mixture of 60–97 wt.% of a polyolefin containing from 0.1–100 wt.% of modified polyolefin having 0.01–10 wt.% of an unsaturated carboxylic acid or anhydride component based on total polyolefin with 40–3 wt.% of a rubber component having 40–150 of Mooney viscosity $ML_{1+4}$ (100° C).

DETAILED DESCRIPTION OF THE PREFERRED EMBODIMENTS

The polyolefins used in the present invention include homopolymers of $\alpha$-olefin such as ethylene and propylene and copolymers of ethylene and the other $\alpha$-olefin such as ethylene-propylne copolymers, ethylene-butene-1 copolymers, ethylene-hexane-1 copolymers and copolymers of $\alpha$-olefins such as propylene-butene-1 copolymers.

These homopolymers and copolymers can be used as a blended mixture. The unsaturated carboxylic acids and anhydrides thereof include acrylic acid, methacrylic acid, maleic acid, fumaric acid, itaconic acid, 3,6-endomethylene tetrahydro phthalic acid and anhydrides thereof. It is especially preferable to use acrylic acid or maleic anhydride. The modified polyolefins can be produced by graft-polymerizing said unsaturated carboxylic acid or anhydride to a polyolefin.

The graft-polymerization can be carried out by a method of melt-blending a polyolefin and said unsaturated carboxylic acid or anhydride with a catalyst in an extruder; or a method of mixing said unsaturated carboxylic acid or anhydride and a catalyst with a suspension of polyolefin in a medium and heating the mixture with stirring.

The modified polyolefin can be blended with an unmodified polyolefin. The modified polyolefin should contain an unsaturated carboxylic acid component in amounts of 0.01 to 10 wt.% so as to give desirable adhesive strength for the lamination of the polyolefin composition including the modified polyolefin and the rubber component to one of a polyester, a polyamide and a hydrolyzed EVA.

In the case of a blend of modified polyolefin and an unmodified polyolefin, the unsaturated carboxylic acid content should be considered 0.01 to 10 wt.% to total polyolefins.

The hydrolyzed EVA used in the invention can be selected from a wide range of compositions and is preferably produced by hydrolyzing ethylene-vinylacetate copolymer having 25–50 mole % of vinylacetate component to a saponification degree of higher than 93% preferably higher than 96% from the viewpoints of gas-barrier property, oil resistance and steam permeability.

The polyamides are linear synthetic high molecular weight compounds having acid amide bonds which are produced by (a) a condensation of a diamine and a dicarboxylic acid; (b) a condensation of amino acid and (c) a cleavage of lactam.

Typical polyamides include nylon 6, nylon 6.6, nylon 6.10, nylon 11, nylon 12 and the like.

The polyesters are produced by a condensation of a saturated dibasic acid and glycol.

Typical polyesters include polyethyleneterephthalates produced by condensation of ethyleneglycol and terephthalic acid; polybutyleneterephthalates produced by a condensation of 1,4-butanediol and terephthalic acid; and polyethyleneterephthalate copolymers and polybutyleneterephthalate copolymers which have a third component of an acid component such as phthalic acid, isophthaic acid, sebacic acid, adipic acid, azelaic acid, glutaric acid, succinic acid, oxalic acid, etc.; and a diol component such as 1,4-cyclohexanedimethanol, diethyleneglycol, propyleneglycol, etc. and blended mixtures thereof.

The rubber components blended to the modified polyolefin in the invention have Mooney viscosity 50 $ML_{1+4}$ (100° C) of 40-150 preferably 40-100 in accordance with ASTM-D15, and are soft compared with the modified polyolefin.

The typical rubber components include natural rubber and synthetic rubbers such as styrene-butadiene rubbe (SBR), acrylonitrile-butadiene rubber (NBR), butyl rubber, chloroprene rubber, silicone rubber, acryl rubber, urethane rubber, polybutadiene rubber, ethylene-propylene rubber, ethylene-propylene terpolymers having a third component of a chain nonconjugated diolefin e.g. 1,4-pentadiene, 1,4-hexadiene, 1,5-hexadiene or a cyclic polyene e.g. dicyclopentadiene, methylenenorbornene, ethylidenenorbornene, cyclooctadiene, methyltetrahydroindene, etc.; polyether rubber; ethylene-butadiene rubber, polybutene-1 rubber and the like.

It is especially preferred to use an ethylene-propylene rubber or ethylene-propylene terpolymer having a third component of ethylidenenorbornene from the viewpoint of blendability to polyolefin, softening effect and cost.

The rate of the rubber component to total composition is in a range of 3-40 wt.% preferably 3-5 wt.% from the viewpoint of improvement of adhesive strength, practical application, physical properties, moldability, transparency, and cost.

When the rubber component content is less than 3 wt.%, an improvement of in adhesive property to the gas-barrier resin which selected from polyesters, polyamides and hydrolyzed EVA cannot be expected, whereas when it is higher than 40 wt.%, the moldability and rigidity of the polyolefin composition are inferior.

When polypropylene or high density polyethylene having high rigidity is used as the polyolefin, it is preferable to add the rubber component together with a soft polymer of a low density polyethylene having 0.2-30 of MI and 0.915-0.925 of specific gravity; or ethylene-vinylacetate copolymer having 5-40 wt.% of vinylacetate content, in order to improve smoothness or transparency.

In such a case, 3-10 wt.% of the rubber component and 2-30 wt.% of the soft polymer are blended.

In the present invention, it is possible to blend 0.1-5 wt. part of a polyamide or a thermoplastic polyester to 100 wt. parts of the total composition of the modified and unmodified polyolefin, the rubber component and the soft polymer.

The polyamide and thermoplastic polyester can be selected from the resins used as gas-barrier resin.

The thermoplastic polyester or polyamide added to the polyolefin composition can be same with or different from the polyester or polyamide laminated.

The method of melt-laminating the polyolefin composition with one of the polyesters, polyamides and hydrolyzed EVA at 180°-300° C by use of the inner die lamination method, the outer die lamination method, the heat pressing method, or the like. It is preferable to apply a pressure higher than 1 Kg/cm² between the laminated resins.

The thicknesses of the modified polyolefin composition layer and the gas-barrier resin layer and the ratio thereof are selected depending upon the application and the structure of container. In the case of a two layer structure, the ratio of the thickness of the gas-barrier resin layer to that of the modified polyolefin composition is 0.01-0.5. The gas-barrier resin layer usually has a thickness of 20-100μ because of high-gas barrier property, perfume impermeability and high cost. The modified polyolefin composition including the unmodified polyolefin with the modified polyolefin has high rigidity and is low cost compared with the gas-barrier resin. Accordingly, the thickness of the modified polyolefin composition is thicker than that of the gas-barrier resin layer and is generally 40μ to 3mm in thickness. Accordingly, the ratio of the thickness of the gas-barrier resin to that of the modified polyolefin composition is 25-50% for a film having flexibility; 1-15% for a container having rigidity and 6-30% for a sheet having both flexibility and rigidity.

When the modified polyolefin composition layer is used between an unmodified polyolefin layer and the gas-barrier resin layer, the thickness of the modified polyolefin layer is similar to that of the gas-barrier resin layer and is 1-50% to that of the unmodified polyolefin layer.

Certain examples of structures of the layers are as follows, wherein the modified polypropylene composition including the rubber component is referred as MPP; the modified high density polyethylene composition including the rubber component is referred as MPE; the polyamide is referred as Ny; the thermoplastic polyester is referred as PET; the unmodified polypropylene is referred as PP; the unmodified low density polyethylene is referred as LD·PE; the unmodified ethylene-vinylacetate is referred as EVA.

Two layers:
MPP/Ny;                         MPP/PET;
MPP/hydrolyzed EVA;             MPE/Ny;
MPE/PET;                        MPE/hydrolyzed EVA Three layers:
PP/MPP/Ny;                      PP/MPP/PET;
PP/MPP/hydrolyzed EVA;
HD . PE/MPP/NY;                 HD . PE/MPP/PET;
HD . PE/MPE/hydrolyzed EVA;
HD . PE/MPE/hydrolyzed HD .
PE/MPE/PET;
HD . PE/MPE/hydrolyzed EVA.

Five layers:
PP/MPP/Ny/MPP/PP;               PP/MPP/PET/MPP-
                                /PP;
PP/MPP/hydrolyzed EVA/MPP/PP;
HD . PE/HPE/Ny/MPE/HD . PE;
HD . PE/MPE/PET/MPE/HD . PE;
HD . PE/MPE/hydrolyzed EVA/MPE/HD . PE.

In the containers having two layer structures, the resin of the inner layer is selected depending upon the application.

For example, in the containers for a polyolefin swelling solvent such as gasoline, toluene, carbontetrachloride, etc., the gas-barrier resin layer is used as the inner layer and the modified polyolefin composition layer is used as the outer layer.

When polyolefin is not damaged by the contents such as cosmetic and soybean sauce and the consumer wishes to use containers having a good appearance, the modified polyolefin composition is used as the inner layer and the gas-barrier resin having high printability is used as the outer layer.

The invention will be illustrated by certain examples.

Friction pull test

The adhesive strength for peeling off was measured by peeling off one end of a test piece having 15 cm of width and clamping each of both layers by each of chucks of an instron tester and pulling off at 90° as T shape peeling.

EXAMPLE 1

A 100 wt. parts of polypropylene powder (PP) (melt index of 0.8 and specific gravity of 0.91) was admixed with 0.8 wt. part of benzoylperoxide, and 1.2 wt. parts of maleic anhydride. The mixture was kneaded by a Hensile mixer and was extruded from an extruder having a diameter of 100 mm and a ratio of L/D of 28 at 220° C, and was pelletized after cooling with water to prepare a modified polypropylene (modified PP). The resulting modified polypropylene was dissolved in a boiled xylene and was reprecipitated from large amount of acetone and the maleic acid component content in the modified polypropylene was measured by an infrared spectrum analysis to give 0.67 wt.% of the maleic acid component content. In order to study the maleic acid component content and the rubber compound content, various compositions of the modified polypropylene (modified PP); an unmodified polypropylene (unmodified PP) (melt index of 0.5 and specific gravity of 0.91); ethylene-propylene terpolymer (EPT) (ethylene content of 70%; propylene content of 15%; ethylidenenorbonene content of 15%; Mooney viscosity of 90) as a rubber compound shown in Table 1 were prepared. These compositions were respectively extruded at 250° C and pelletized as stated above.

The resulting pellets were respectively sheeted as a pressed sheet having 0.5 mm of thickness and a hydrolyzed copolymer of ethylene-vinylacetate (vinylacetate content of 1 wt.%; vinylalcohol content of 41 wt.%; ethylene content of 58 wt.%) was also sheeted as a pressed sheet having 0.5 mm of thickness.

Both sheets were melt-pressed under heating at 180° C, 40 Kg/cm$^2$ (gauge) for 3 minutes to prepare each laminated product. The modified polypropylene composition which does not include said ethylene-propylene terpolymer was used in the same condition to form the laminated product.

The adhesive strength of the laminated layers of each of the laminated products is shown in Tables I and II.

Table (I)

| | Study on maleic acid component contents: Modified polyolefin composition | | | | wt. parts |
|---|---|---|---|---|---|
| Unmodified PP | 75 | 70 | 60 | 0 | 100 |
| Modified PP | 5 | 10 | 20 | 80 | 0 |
| EPT | 20 | 20 | 20 | 20 | 0 |
| Maleic acid component content (wt.%) | 0.04 | 0.08 | 0.17 | 0.67 | 0 |
| Adhesive strength (Kg/15 mm) | 5.4 | 6.0 | 6.5 | 11.4 | 0 |

Table (II)

| | Study on rubber compound content: Modified polyolefin composition | | | | | | | wt. parts |
|---|---|---|---|---|---|---|---|---|
| Unmodified PP | 90 | 87 | 85 | 80 | 70 | 60 | 50 | 40 |
| Modified PP | 10 | 10 | 10 | 10 | 10 | 10 | 10 | 10 |
| EPT | 0 | 3 | 5 | 10 | 20 | 30 | 40 | 50 |
| Adhesive strength (Kg/15 mm) | 0.5 | 0.7 | 1.0 | 1.5 | 6.0 | 3.0 | 2.0 | 1.8* |

Note *A rigidity was not suitable as a container.

EXAMPLE 2

The maleic anhydride modified polypropylene used in Example 1 was blended with polypropylene and ethylene-propylene terpolymer as shown in Table III and then the blended mixtures were respectively extruded at 250° C and pelletized.

The resulting pellets were respectively sheeted as a pressed sheet having 0.5 mm of thickness and polyethylene-terephthalate was also sheeted as a pressed sheet having 0.5 mm of thickness. Both of sheets were melt-pressed at 250° C under 40 Kg/cm$^2$ (gauge) for 3 minutes by an electrical press to form each laminated product.

The adhesive strength of the laminated layers of each of the laminated products is shown in Table III.

Table (III)

| | Modified polyolefin composition : | | | | | | | wt. parts |
|---|---|---|---|---|---|---|---|---|
| Unmodified PP | 90 | 87 | 85 | 80 | 70 | 60 | 50 | 40 |
| Modified PP | 10 | 10 | 10 | 10 | 10 | 10 | 10 | 10 |
| EPT | 0 | 3 | 5 | 10 | 20 | 30 | 40 | 50 |
| Adhesive strength (Kg/15 mm) | 0.4 | 0.6 | 0.8 | 1.5 | 4.0 | 3.0 | 2.0 | 1.8* |

Note *A rigidity was not suitable as a container.

EXAMPLE 3

In accordance with the process of Example 2 except using nylon 6 instead of polyethyleneterephthalate and melt-pressing at 230° C instead of 250° C, laminated products were prepared.

The adhesive strength of each of the laminated products is shown in Table IV.

Table (IV)

| | Modified polyolefin composition: | | | | | | | wt. parts |
|---|---|---|---|---|---|---|---|---|
| Unmodified PP | 90 | 87 | 85 | 80 | 70 | 60 | 50 | 40 |
| Modified PP | 10 | 10 | 10 | 10 | 10 | 10 | 10 | 10 |
| EPt | 0 | 3 | 5 | 10 | 20 | 30 | 40 | 50* |
| Adhesive strength (Kg/15 mm) | 0.5 | 1.0 | 1.5 | 3.5 | 7.0 | 4.0 | 3.0 | 2.5 |

Note *A rigidity was not suitable for container.

EXAMPLE 4

To 100 wt. parts of high density polyethylene powder (melt index of 1.5; specific gravity of 0.96) was admixed with 0.2 wt. part of 3,5,5-trimethyl hexanoyl peroxide and 0.3 wt. part of maleic anhydride in a Hensile mixer.

The mixture was extruded from an extruder having a diameter of 40 mm and a ratio of L/D of 28 at 220° C and was cooled with water and pelletized to obtain a modified high density polyethylene.

A 80 wt. parts of the resulting modified high density polyethylene (maleic acid component content of 0.3 wt.%) was admixed with 20 wt. parts of ethylene-propylene terpolymer and the composition was extruded and pelletized to prepare pellets of modified polyolefin composition. The resulting pellets were sheeted as a pressed sheet having 0.5 mm of thickness and laminated with the pressed sheet of the hydrolyzed ethylenevinylacetate of Example 1 by a steam press by preheating them at 180° C for 3 minutes and melt-pressing under 40 Kg/cm$^2$ for 3 minutes to prepare the laminated product.

The adhesive strength of the laminated layers of the laminated product was 6.0 Kg/15 mm.

EXAMPLE 5

A 20 wt. parts of the modified polypropylene of Example 1 was admixed with 60 wt. parts of an unmodified polypropylene and 20 wt. parts of ethylene-propylene terpolymer to prepare pellets of a modified polyolefin composition.

The modified polyolefin composition and polyethyleneterephthalate were molded by an inner die laminating blow molding method to prepare a bottle having composite layers of an inner layer of polyethyleneterephthalate having 40 μ of thickness and an outer layer of the modified polyolefin composition having 0.5 mm of thickness.

The temperatures of the resins at the molding were 230° C for the modified polyolefin composition and 270° C for polyethyleneterephthalate. The pressure of the resins at the lamination was 5 Kg/cm² gauge. As the reference, an unmodified polypropylene (melt index of 0.5; specific gravity of 0.91) was used instead of the modified polyolefin composition and was laminated with polyethyleneterephthalate.

The adhesive strength of the laminated layers of each of the laminated products was as follows.

Modified polyolefin composition: 3 Kg/15 mm
Unmodified PP: 0 Kg/15 mm.

The oxygen permeability of the laminated product at 30° C in 0% of relative humidity was as follows.

Modified polyolefin composition 120 cc/m².24 hr/atm.

EXAMPLE 6

A 10 wt. parts of the modified polypropylene of Example 1 was admixed with 70 wt. parts of an unmodified polypropylene (melt index of 0.5; specific gravity of 0.91) and 20 wt. parts of polybutadiene rubber (Mooney viscosity of 50) by a steam roller mill at 180° C for 5 minutes to prepared a modified polyolefin composition.

The modified polyolefin composition was sheeted as a sheet having 0.5 mm of thickness and the hydrolyzed copolymer of ethylene-vinylacetate was sheeted as a sheet having 0.5 mm of thickness.

Both of sheets were melt-pressed by a steam press at 180° C under 40 Kg/cm² gauge for 3 minutes to form a laminated product.

The adhesive strength of the laminated layers of the laminated product was 2.0 Kg/15 mm.

EXAMPLE 7

The modified polypropylene of Example 1 was admixed with an unmodified polypropylene (melt index of 0.5; specific gravity of 0.91) and ethylene-vinylacetate copolymer (EVA) (melt index of 12; specific gravity of 0.938; vinylacetate content of 16 wt.%) as shown in Table V.

The mixture was extruded at 250° C and pelletized to prepare pellets of the modified polyolefin composition.

The modified polyolefin composition was sheeted as a sheet having 0.5 mm of thickness and a hydrolyzed copolymer of ethylene-vinylacetate (vinylacetate) component of 1 wt.%; vinylalcohol component 41 wt.% and ethylene component of 58 wt.%) was sheeted as a sheet having 0.5 mm of thickness.

Both of sheets were melt-pressed by a steam press at 180° C under 40 Kg/cm² (gauge) for 3 minutes to prepare each of laminated products.

The adhesive strength of the laminated layers of each of the laminated products is as follows.

Table (V)

| | Modified polyolefin composition: | | | | | wt. parts |
|---|---|---|---|---|---|---|
| Unmodified PP | 89 | 85 | 80 | 70 | 50 | 30 |
| Modified PP | 1 | 5 | 10 | 20 | 40 | 60 |
| EVA | 10 | 10 | 10 | 10 | 10 | 10 |
| Maleic anhydride component content (wt. %) | 0.006 | 0.03 | 0.06 | 0.13 | 0.27 | 0.40 |
| Adhesive strength (Kg/15 mm) | 0.4 | 1.3 | 2.2 | 3.4 | 5.2 | 7.0 |

EXAMPLE 8

A 77 wt. parts of acrylic acid modified polypropylene (melt index of 1.5; specific gravity of 0.91; acrylic acid component of 2.5 wt.%) was admixed with 20 wt. parts of low density polyethylene (melt index of 0.5; specific gravity of 0.92) and 3 wt. parts of ethylene-propylene rubber by a steam roller mill at 180° C for 5 minutes; and pelletized after cooling it to prepare pellets of a modified polyolefin composition. The modified polyolefin composition was sheeted as a sheet having 0.5 mm of thickness and the hydrolyzed copolymer of ethylene-vinylacetate was sheeted as a sheet having 0.5 mm of thickness.

Both of sheets were melt-pressed by a steam press at 180° C under 40 Kg/cm² for 3 minutes to prepare a laminated product.

The adhesive strength of the laminated layers of the laminated product was 2.5 Kg/15 mm.

EXAMPLE 9

The maleic anhydried modified polypropylene of Example 1 was admixed with an unmodified polypropylene (melt index of 0.3; specific gravity of 0.91), low density polyethylene (LD.PE) (melt index of 0.5; specific gravity of 0.92) and ethylene-propylene terpolymer (EPT) (ethylene component of 70 wt.%; ethylidenenorbornene component of 15 wt.%;

Mooney viscosity of 90) as shown in Table VI and then each of the mixture was extruded at 250° C and pelletized to prepare pellets of each of modified polyolefin compositions.

The modified polyolefin composition was sheeted as a sheet having 0.5 mm of thickness and the hydrolyzed copolymer of ethylene-vinylacetate of Example 1 was sheeted as a sheet having 0.5 mm of thickness.

Both of sheets were melt-pressed by a steam press at 180° C under 40 Kg/cm² (gauge) for 3 minutes to prepare a laminated product.

The adhesive strength of the laminated layers of each of the laminated products is as follows.

Table (VI)

| | Modified polyolefin composition | | | | | | | |
|---|---|---|---|---|---|---|---|---|
| | wt. parts | | | | | | | |
| Unmodified PP | 76 | 73 | 71 | 66 | 56 | 46 | 36 | 26 |
| Modified PP | 20 | 20 | 20 | 20 | 20 | 20 | 20 | 20 |
| LD . PE | 0 | 3 | 5 | 10 | 20 | 30 | 40* | 50* |
| EPT | 4 | 4 | 4 | 4 | 4 | 4 | 4 | 4 |
| Adhesive strength (Kg/15 mm) | 0.8 | 1.0 | 2.0 | 6.5 | 4.0 | 2.5 | 1.5 | 0.9 |
| Unmodified PP | 85 | 83 | 81 | 76 | 66 | | | |
| Modified PP | 1 | 3 | 5 | 10 | 20 | | | |
| LD . PE | 10 | 10 | 10 | 10 | 10 | | | |
| EPT | 4 | 4 | 4 | 4 | 4 | | | |
| maleic anhydride component content | 0.006 | 0.02 | 0.03 | 0.06 | 0.13 | | | |

Table (VI)-continued

| Modified polyolefin composition | | | | | | |
|---|---|---|---|---|---|---|
| | | | wt. parts | | | |
| (wt.%) Adhesive strength (Kg/15 mm) | 0.5 | 1.3 | 2.5 | 4.0 | 6.5 | |
| Unmodified PP | 70 | 69 | 68 | 65 | 60 | 50 |
| Modified PP | 20 | 20 | 20 | 20 | 20 | 20 |
| LD.PE | 10 | 10 | 10 | 10 | 10 | 10 |
| EPT | 0 | 1 | 2 | 5 | 10 | 20 |
| Adhesive strength (Kg/15 mm) | 1.5 | 2.5 | 4.0 | 7.0 | 6.0 | 5.0 |

Note
*A rigidity was not suitable for container.

EXAMPLE 10

A 20 wt. parts of the modified polypropylene of Example 1, 65 wt. parts of an unmodified polypropylene (melt index of 0.3; specific gravity of 0.91), 5 wt. parts of ethylene-propylene terpolymer and 10 wt. parts of low density polyethylene (melt index of 0.5; specific gravity of 0.92) were mixed by a Hensile mixer and then the mixture was extruded from an extruder having a screw of a diameter of 40 mm and a ratio of L/D of 28 at 250° C, and was pelletized after cooling with water to prepare pellets of a modified polyolefin composition.

The modified polyolefin composition and the hydrolyzed copolymer of ethylene-vinylacetate were molded by an inner die laminating blow molding method to prepare a bottle having composite layers of an inner layer of the hydrolyzed copolymer of ethylene-vinylacetate and an outer layer of the modified polyolefin composition.

The temperatures of resins at the molding were 230° C for the outer layer and 210° C for the inner layer.

The pressure of the resins at the lamination was 5 Kg/cm² (gauge).

The thickness of the outer layer was 0.8 mm and the thickness of the inner layer was 60 $\mu$.

The adhesive strength of the laminated layers was 4.0 Kg/15 mm.

EXAMPLE 11

A 66 wt. parts of the unmodified polypropylene, 20 wt. parts of the modified polypropylene, 4 wt. parts of ethylene-propylene terpolymer which were used in Example 1 and 10 wt. parts of the low density polyethylene of Example 9 and 0.5 wt. part of nylon 6 were mixed, and then extruded as a sheet having 0.5 mm of thickness of modified polyolefin composition.

A sheet having 0.5 mm of thickness of nylon 6 was also prepared.

Both of sheets were melt-pressed by an electrical press at 230° C under 40 Kg/cm² for 3 minutes to prepare a laminated product.

The adhesive strength of the laminated layers of the laminated product was 10 Kg/15 mm.

EXAMPLE 12

A 20 wt. parts of the maleic anhydride modified polypropylene, 66 wt. parts of the unmodified polypropylene, 10 wt. parts of low density polyethylene, 4 wt. parts of ethylene-propylene terpolymer which were used in Example 1 and 0.5 wt. part of a linear polyester (molecular weight 18,000) were mixed and extruded from an extruder having a diameter of 40 mm and a ratio of L/D of 28 at 250° C and was pelletized after cooling with water to prepare a modified polyolefin composition.

The resulting modified polyolefin composition and polyethyleneterephthalate (molecular weight 20,000) were molded by an inner die laminating blow molding method to prepare a bottle having composite layers of an inner layer of polyethyleneterephthalate having 40 $\mu$ of thickness and an outer layer of the modified polyolefin composition having 0.5 mm of thickness.

The temperatures of resins at the molding were 230° C for the outer layer and 270° C for the inner layer.

The pressure of the resin at the lamination was 5 Kg/cm² (gauge).

The adhesive strength of the laminated layers of the laminated product was 3.0 Kg/15 mm.

EXAMPLE 13

A 10 wt. parts of the modified high density polyethylene, 80 wt. parts of unmodified high density polyethylene of Example 4, 5 wt. parts of low density polyethylene (melt index of 0.5; specific gravity of 0.92) and 5 wt. parts of ethylene-propylene terpolymer of Example 1 were mixed and then extruded and pelletized to prepare pellets of the modified polyolefin composition.

The modified polyolefin composition and the hydrolyzed copolymer of ethylene-vinylacetate of Example 1 were respectively sheeted to prepare each of press sheets having 0.5 mm of thickness.

Both of sheets were preheated at 180° C for 3 minutes and melt-pressed by a steam press at 180° C under 40 Kg/cm² (gauge) for 3 minutes to prepare a laminated product.

The adhesive strength of the laminated layers of the laminated product was 3.5 Kg/15 mm.

EXAMPLE 14

The maleic anhydride modified polypropylene and the unmodified polypropylene and which were used in Example 1 and the ethylene-propylene rubber (EPR) (ethylene component of 50 wt.%, Mooney viscosity of 50), the low density polyethylene and the linear polyester of Example 12 were mixed as shown in Table VII and the mixture was extruded at 250° C and pelletized after cooling with water to prepare pellets of each modified polyolefin composition.

The modified polyolefin composition and polyethyleneterephthalate of Example 12 were respectively sheeted to prepare each of pressed sheets having 0.5 mm of thickness.

Both of sheets were melt-pressed by an electrical press at 270° C under 40 Kg/cm² (gauge) for 5 minutes to prepare each of laminated products.

The adhesive strength of the laminated layers of each of the laminated products is as follows.

Table (VII)

| Modified polyolefin copolymer: | | | wt. parts | | | | |
|---|---|---|---|---|---|---|---|
| Unmodified PP | 90 | 87 | 85 | 80 | 70 | 60 | 50 | 40 |
| Modified PP | 10 | 10 | 10 | 10 | 10 | 10 | 10 | 10 |
| EPR | 0 | 3 | 5 | 10 | 20 | 30 | 40 | 50* |
| Linear polyester | 0.5 | 0.5 | 0.5 | 0.5 | 0.5 | 0.5 | 0.5 | 0.5 |
| Adhesive strength (Kg/15 mm) | 0.3 | 0.5 | 0.8 | 1.5 | 3.0 | 2.5 | 2.0 | 1.8 |

Note *A rigidity was not suitable as a container.

EXAMPLE 15

In accordance with the process of Example 14 except using nylon 6 instead of polyethyleneterephthalate and melt-pressing at 230° C instead of 270° C, the laminated products were prepared.

The adhesive strength of the laminated layers of each of the laminated product is as follows.

Table (VIII)

| Modified polyolefin composition: wt. prts | | | | | | | | |
|---|---|---|---|---|---|---|---|---|
| Unmodified PP | 90 | 87 | 85 | 80 | 70 | 60 | 50 | 40 |
| Modified PP | 10 | 10 | 10 | 10 | 10 | 10 | 10 | 10 |
| EPR | 0 | 3 | 5 | 10 | 20 | 30 | 40 | 50* |
| Linear polyester | 0.5 | 0.5 | 0.5 | 0.5 | 0.5 | 0.5 | 0.5 | 0.5 |
| Adhesive strength (Kg/15 mm) | 0.5 | 1.0 | 2.0 | 3.8 | 6.5 | 4.5 | 3.0 | 2.0 |

Note *A rigidity was not suitable as a container.

EXAMPLE 16

A 10 wt. parts of the maleic anhydride modified polypropylene of Example 1, 66 wt. parts of the unmodified polypropylene (melt index of 3; specific gravity of 0.91), 0.5 wt. part of the linear polyester of Example 12, 20 wt. parts of low density polyethylene (melt index of 45; specific gravity of 0.92) and 4 wt. parts of ethylene-propylene terpolymer of Example 1 were mixed and then extruded from an extruder having a diameter of 65 mm and a ratio of L/D of 28 at 250° C and pelletized after cooling with water, to prepare pellets of a modified polyolefin composition.

A laminated film of polypropylene (melt index 9; specific gravity of 0.91)/the modified polyolefin composition/nylon 6 was prepared by an inner die lamination molding method by using the modified polyolefin composition as an inner layer, (thickness layers of 30 $\mu$/30 $\mu$/30 $\mu$).

The adhesive strength of the outer laminated layers of the laminated film was 0.8 Kg/15 mm.

EXAMPLE 17

In accordance with the process of Example 16 except using polyethylene-terephthalate of Example 12 instead of nylon 6, a laminated film of polypropylene/the modified polyolefin composition/polyethyleneterephthalate was prepared.

The adhesive strength of the outer laminated layers of the laminated film was 0.3 Kg/15 mm.

EXAMPLE 18

In accordance with the process of Example 16 except using a hydrolyzed copolymer of ethylene-vinylacetate of Example 1 instead of nylon 6, a laminated film of polypropylene/the modified polyolefin composition/hydrolyzed EVA was prepared.

The adhesive strength of the outer laminated layers of the laminated film was 0.3 Kg/15 mm.

What is claimed is:

1. In a process for preparing a laminated resin product by melt-laminating (1) a modified polyolefin composition with (2) a polyester, a polyamide or a hydrolyzed copolymer of ethylene-vinylacetate, the improvement comprising: laminating a layer of said polyester, polyamide or hydrolyzed copolymer or ethylene-vinyl-acetate with a layer of said modified polyolefin composition comprising a mixture of 60 –97 wt.% of a polyolefin which comprises from 0.1 to 100 wt.% of a polyolefin modified with an unsaturated carboxylic acid or anhydride thereof such that the unsaturated acid or anhydride content is from 0.01 to 10 wt.% of the total polyolefin content and wherein an unmodified polyolefin comprises from 99.9 to 0 wt.% of the total polyolefin content with 40 – 3 wt.% of a rubbery component having a Mooney viscosity (50 MH$_1$ + $_4$(100° C) ) of 40 – 140.

2. The process for preparing a laminated resin product of claim 1, wherein 2 – 30 wt.% of said polyolefin is substituted with a soft resin of a low density polyethylene having a melt index of 0.2 to 30 and a specific gravity of 0.915 to 0.925 or a copolymer of ethylene-vinylacetate having a melt index of 0.5 to 20 and a vinylacetate component content of less than 40 wt.%.

3. The process for preparing a laminated resin product of claim 1, wherein 0.1 to 5 wt. parts of a polyamide or a thermoplastic polyester is added to 100 wt. parts of the modified polyolefin composition.

4. The process of claim 1, wherein the rubber component is a ethylene-propylene rubber or an ethylene-propylene terpolymer.

5. The process of claim 1, wherein the rubber component is an ethylene-propylene terpolymer having as the third component either ethylidenenorbornene or cyclopentadiene.

6. A laminated resin product, which comprises: (1) a gas-barrier polymer layer of a polyester, a polyamide or a hydrolyzed copolymer of ethylene-vinylacetate and (2) a modified polyolefin composition layer laminated thereon, wherein said modified polyolefin composition is a mixture of 60 – 97 wt.% of a polyolefin which polyolefin comprises 0.1 to 100 wt.% of a polyolefin modified with an unsaturated carboxylic acid or anhydride thereof such that the unsaturated acid or anhydride content is from 0.01 ot 10 wt.% of the total polyolefin content and wherein an unmodified polyolefin comprises from 99.9 to 0 wt.% of the total polyolefin content with 40 – 3 wt.% of a rubber component having a Mooney viscosity (50 ML$_1$ + $_4$(100° C) ) of 40 – 150.

7. A laminated resin product, which comprises: (1) a gas-barrier polymer layer of a polyester, a polyamide or a hydrolyzed copolymer of ethylene-vinylacetate and (2) a modified polyolefin composition layer as a middle layer and (3) a polyolefin layer, wherein said modified polyolefin composition is a mixture of 60 – 97 wt.% of a polyolefin which polyolefin comprises from 0.1 to 100 wt.% of a polyolefin modified with an unsaturated carboxylic acid or anhydride thereof such that the unsaturated acid or anhydride content is from 0.01 to 10 wt.% of the total polyolefin content and wherein an unmodified polyolefin comprises from 99.9 to 0 wt.% of the total polyolefin content with 40 – 3 wt.% of a rubber component having a Mooney viscosity (50 ML$_1$ + $_4$ (100°) ) of 40 – 150.

8. A laminated resin product, which comprises: (1) a gas-barrier polymer layer of a polyester, a polyamide or a hydrolyzed copolymer of ethylene-vinyl acetate and (2) modified polyolefin composition layers which are laminated on both surfaces of said gas-barrier polymer layer and (3) polyolefin layers which are laminated on each of said modified polyolefin composition layers, wherein said modified polyolefin composition is a mixture of 60 – 97 wt.% of a polyolefin which polyolefin comprises from 0.01 to 100 wt.% of a polyolefin modified with an unsaturated carboxylic acid or anhydride thereof such that the unsaturated acid or anhydride content is from 0.01 to 10 wt.% of the total polyolefin content and wherein an unmodified polyolefin comprises from 99.9 to 0 wt.% of the total polyolefin content with 40 - 3 wt.% of a rubber component having a Mooney viscosity (50 ML$_1$ + $_4$(100°0 C) of 40 - 150.

9. The laminated resin product of claim 6, wherein 2-30 wt.% of said polyolefin is substituted with a soft resin of a low density polyethylene having a melt index of 0.2 to 30 and a specific gravity of 0.915 to 0.925 or a copolymer of ethylene-vinylacetate having a melt index of 0.5 to 20 and a vinylacetate component content of less than 40 wt.%.

10. The laminated resin product of claim 6, wherein 0.1 to 5 wt. parts of a polyamide or a thermoplastic polyester is added to 100 wt. parts of the modified polyolefin composition.

11. The laminated resin product of claim 6, wherein the rubber component is an ethylene-propylene rubber or an ethylene-propylene terpolymer.

* * * * *